United States Patent
Langston et al.

(10) Patent No.: US 6,193,043 B1
(45) Date of Patent: Feb. 27, 2001

(54) RETRACTABLE ROLLER SYSTEM FOR HANDLING CARGO

(75) Inventors: Frances J. Langston, Long Beach; Michael Graf, Lomita, both of CA (US)

(73) Assignee: Ancra International LLC, Hawthorne, CA (US)

( * ) Notice: Subject to any disclaimer, the term of this patent is extended or adjusted under 35 U.S.C. 154(b) by 0 days.

(21) Appl. No.: 09/313,310

(22) Filed: May 17, 1999

(51) Int. Cl.[7] .................................................. B65G 13/00
(52) U.S. Cl. ............................................................ 193/35 SS
(58) Field of Search ........................... 193/35 SS, 35 R; 244/137.1; 414/534, 535

(56) References Cited

U.S. PATENT DOCUMENTS

| | | | |
|---|---|---|---|
| 4,089,399 | * 5/1978 | Webb | 193/35 SS |
| 4,205,740 | * 6/1980 | Hammond | 193/35 A |
| 4,258,766 | * 3/1981 | Van Dijk | 193/35 SS |
| 4,823,927 | 4/1989 | Jensen | 193/35 SS |
| 4,909,372 | * 3/1990 | Jones | 193/35 SS |
| 4,930,612 | * 6/1990 | Thorndyke | 193/35 SS |
| 4,967,894 | * 11/1990 | Thunnissen | 193/35 SS |
| 5,738,199 | * 4/1998 | Moradians | 193/35 R |

* cited by examiner

Primary Examiner—Robert P. Olszewski
Assistant Examiner—Paul T. Chin
(74) Attorney, Agent, or Firm—Edward A. Sokolski

(57) ABSTRACT

A retractable roller system has a main channel mounted on the floor of a vehicle into which cargo is to be loaded. A pneumatically actuated bladder is mounted along the bottom of the channel and a roller tray on which a plurality of roller members are rotatably supported is mounted in the channel above the bladder. Flange members extend inwardly from the side walls of the channel at different vertical levels. Flange members extend outwardly at different vertical levels from the opposing side walls of the roller tray. The rollers are raised to handle the loading of cargo by inflating the bladder and lowered to recess the rollers below the level of a cover plate to keep the cargo in a desired location. The cover plate utilizes a minimum number of screws in conjunction with a mating coupler plate and slots and for adjacent units which engage pins on the channel to provide secure retention of the plate yet facilitating ready removal when the roller tray needs to be removed for repair or replacement. Such removal can be readily accomplished by tilting the roller tray sideways to permit the side flanges of the roller tray to clear the side flanges of the channel.

5 Claims, 2 Drawing Sheets

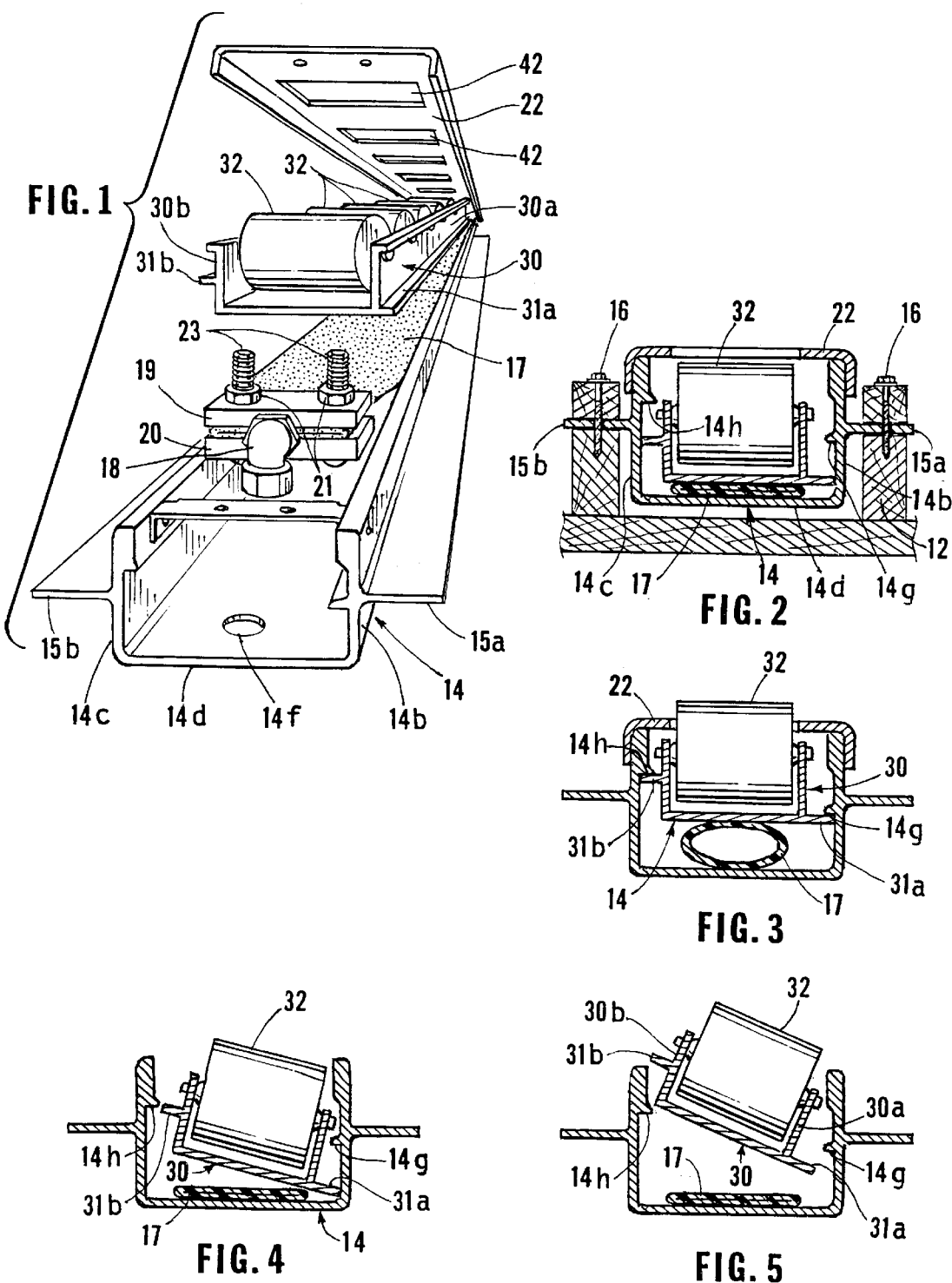

RETRACTABLE ROLLER SYSTEM FOR HANDLING CARGO

BACKGROUND OF THE INVENTION

1. Field of the Invention

This invention relates to a cargo handling system, and more particularly to such a system employing rollers which can alternatively either be raised for use in rolling cargo into position or lowered to retract the rollers below the level of a loading platform when the cargo is in a desired location.

2. Description of the Related Art

Roller rail assemblies are commonly used for loading cargo. Such a system is described in U.S. Pat. No. 4,823,927 issued Apr. 25, 1989 to Ancra Corporation, the assignee of the present invention. In the roller rail cargo loading system, pneumatically actuated bladders are employed which are inflated to raise the rollers above the level of the loading platform for use in loading cargo and deflated to retract the rollers below the level of the platform surface when the cargo is to be held in place. With such retractable roller systems, it is necessary to periodically remove the rollers and the inflatable bladder for cleaning, maintenance and replacement. In the above indicated prior art patent, flanges are provided on the main channel and roller tray of the device to facilitate such removal. In this system, however, the top plate is secured with multiple screws which increases the time and effort needed for removal.

SUMMARY OF THE INVENTION

The device of the present invention is an improvement over the prior art in that it provides an improved structure for connecting the top plate of the device to the main channel thereof. This top plate structure is firmly retained in position, yet requires only three screws for its removal. This end result is achieved by utilizing a locking pin on one unit and a slot on the other into which the pin fits for joining adjacent roller units to each other. This assures firm retention between the units while requiring only a single screw to hold the pin in the slot. A pair of screws are employed on the extreme end of the device to retain the top plate to a flange which is attached to the main channel.

As for the device described in U.S. Pat. No. 4,823,927, the device of invention employs flanges which extend inwardly from the side walls of the main channel in which the rollers are mounted and flanges which extend outwardly from the side walls of the roller tray in which the rollers are rotatably supported. The flanges on one side of the roller tray and the main channel are vertically offset from the flanges on the opposite side such that the roller tray can be tilted with the bladder deflated to facilitate removal of the tray from the channel.

It is therefore an object of this invention to provide an improved retractable roller system which can more easily be disassembled for repair or replacement of parts.

Other objects of the invention will become apparent as the description proceeds in connection with the accompanying drawings.

DESCRIPTION OF THE DRAWINGS

FIG. 1 is an exploded end perspective view showing a preferred embodiment of the device of the invention;

FIG. 2 is an end elevational view of the preferred embodiment;

FIG. 3 is an end elevational view of the preferred embodiment with the bladder inflated and the rollers raised;

FIG. 4 is an end elevational view of the preferred embodiment showing the bladder deflated and the roller tray showing the roller tray in the process of being removed;

FIG. 5 is an end elevational view of the preferred embodiment with the bladder deflated showing the roller tray immediately prior to its being lifted out of the main channel;

DETAILED DESCRIPTION OF THE INVENTION

Figure 6:
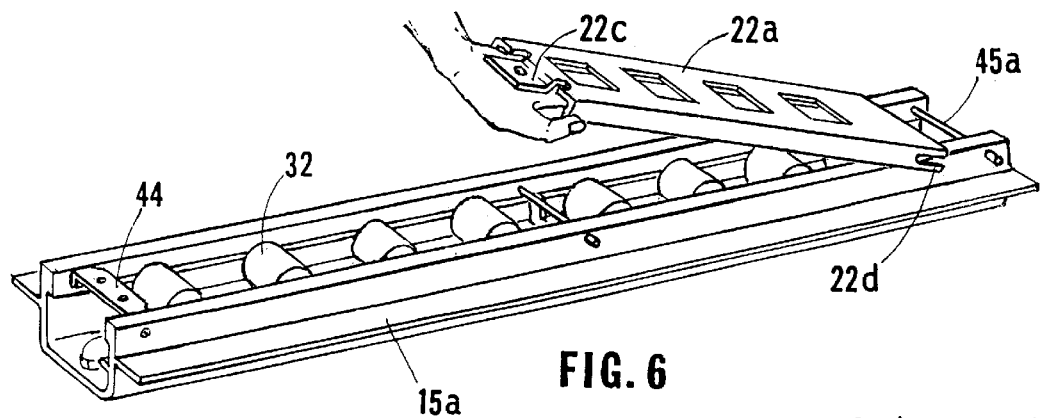
FIG. 6 is a side perspective view showing a first step in the installation of the top cover plate of the preferred embodiment.

Referring now to FIGS. 1–5, a preferred embodiment of the invention is illustrated. Main channel member 14 has a bottom wall 14d and a pair of opposing side walls 14b and 14c. Main channel member 14 is supported on the frame or floor of a vehicle by means of flanges 15a and 15b which are integrally formed on the channel member and extend from side walls 14a and 14b respectively. The flanges are attached to the vehicle frame or floor 12 by means of screws 16 which fit through apertures which may be drilled through flanges 15a and 15b. Channel 14 has a first ledge 14g extending inwardly and normally from one of the side walls thereof and a second ledge 14h extending inwardly and normally from the other of the side walls thereof, the second ledge being at a higher elevation than the first ledge. Inflatable bladder 17 is supported on he bottom wall 14d of the channel, an air inlet nozzle 18 being connected to the air inlet of the bladder.

The ends of bladder 17 are sandwiched between a pair of plates 19 and 20 which have grooved portions(not shown) formed in the center thereof to accommodate nozzle 18 which fits through aperture 14f in channel member 14. Plates 19 and 20 are clamped together to firmly secure the bladder by means of bolts 23 which are engaged by nuts 21. Cover plate 22, is connected to the top of channel 14 as to be explained further on in connection with FIGS. 6–10.

Roller tray 30 has a plurality of roller members 32 rotatably supported between the opposing walls 30a and 30b 8 thereof. Wall 30a has a ledge 31a extending outwardly and normally therefrom along the bottom edge thereof while wall 30b has a ledge 31b extending outwardly and normally therefrom at a location therealong spaced between the top and bottom edges thereof. Top cover plate 22 is removably attached to the top edges of channel 14 as to be explained in connection with FIGS. 6–10. Rectangular apertures 42 are formed in the cover plate to accommodate each of the rollers 32 so that they are free to fit therethrough when the bladder is in the inflated condition, as shown in FIG. 3.

With the bladder deflated, as shown in FIG. 2, the roller tray rests on the deflated bladder 17 with the rollers 32 recessed below the outer surfaces of cover plate 22. with bladder 17 inflated, as sown in FIG. 3, roller tray 30 is driven upwardly until the ledges 31a and 31b thereof abut against ledges 14g and 14h of the channel respectively. In this position, rollers 32 protrude above the surfaces of plate 22 so that they are accessible to provide the desired rolling action of a pallet thereon. In this position, the ledges in conjunction with the pneumatic force provided to the bladder operate to retain the roller tray in the elevated position of FIG. 3.

When it is necessary to remove the bladder assembly or roller tray for repair or replacement, this can easily be done by first removing the cover plate and with the bladder deflated successively tilting the roller tray 30 as shown in FIGS. 4 and 5 such that the tray can be removed from the channel with the ledges 31a and 14g and 31b and 14h clearing each other.

Figure 7:
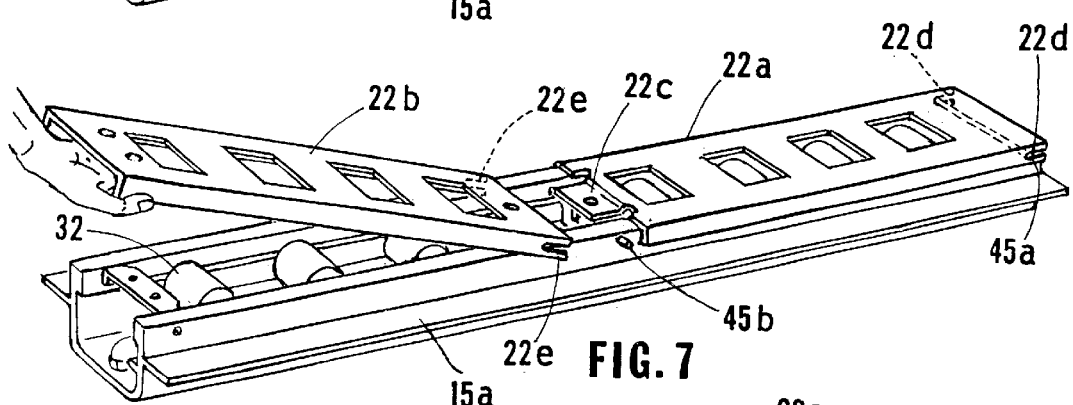
FIG. 7 is a side perspective view showing a second step in the installation of the cover plate of the preferred embodiment.
Figure 8:
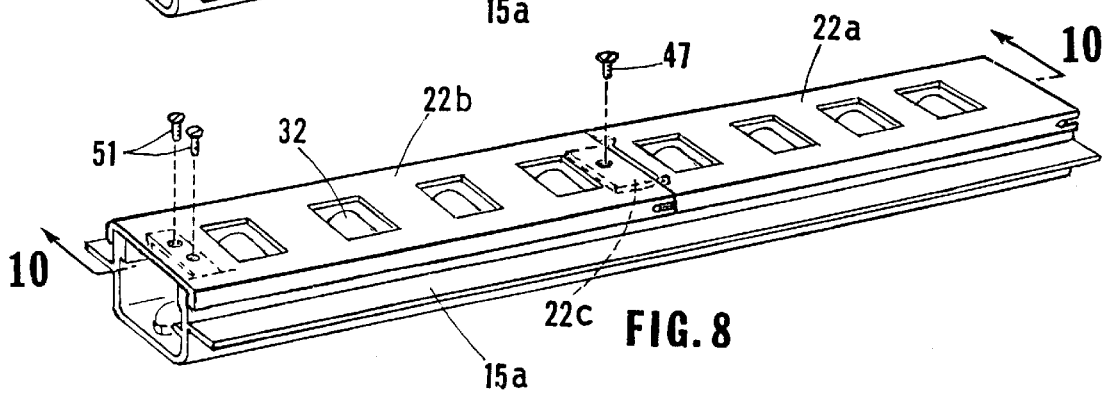
FIG. 8 is a side perspective view showing the cover plate of the preferred embodiment installed in place.
Figure 9:
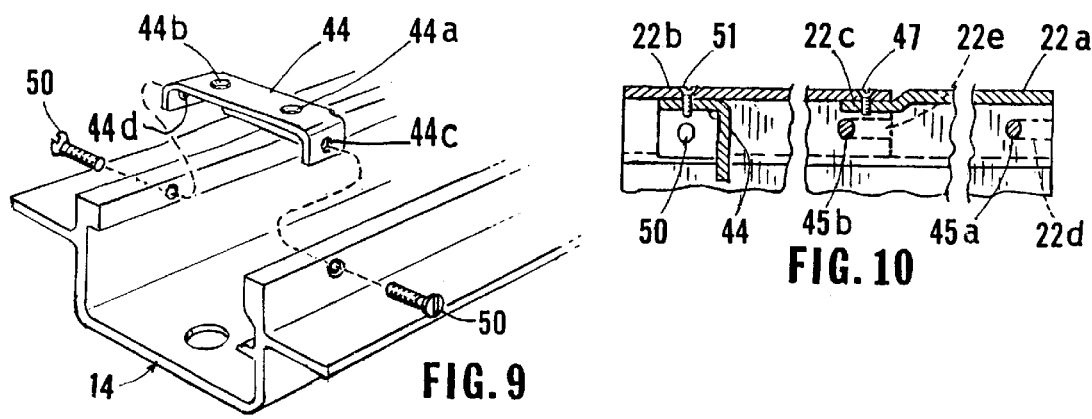
FIG. 9 is side perspective view illustrating the installation of the end support for the cover plate in the preferred embodiment.
Figure 10:
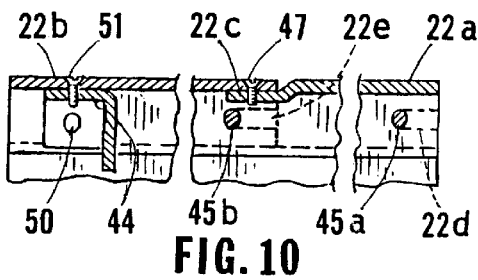
FIG. 10 is a cross sectional view taken along the plane indicated by 10—10 in FIG. 8.

Referring now to FIGS. 6–10, the installation and removal of the cover plate 22 is illustrated. Cover plate 22 is made in two pieces 22a and 22b. In installing the cover plate, piece 22a is first placed in position by sliding slots 22d over the ends of pin member 45a so that the ends of piece 22a are retained on the pin member as shown in FIG. 7. Piece 22b is similarly installed in position over second pin member 45b by sliding slots 22e onto pin member 45b as shown in FIGS. 7 and 8. Cover plate piece 22a has a ledge 22c formed thereon which has a threaded aperture. Cover plate pieces 22a and 22b are secured to each other by means of a single screw 47 which passes through an aperture in piece 22b and threadably engages an aperture in ledge 22a as shown in FIG. 8. Bracket 44 which has a pair of threaded apertures 44a and 44b formed in its top portion is attached to bottom tray 14 by means of set screws 50 which engage threaded apertured portions 44c and 44d formed in the bottom tray. The end of cover plate piece 22b is attached to bracket 44 by means of a pair of screws 51 which fit through apertures formed in cover plate piece 22b and threadably engage the apertures 44a and 44b formed in the bracket. Thus, the cover plate can readily be firmly installed in place using only three screws which greatly facilitates its installation and removal.

While the invention has been described in detail, it is to be understood that this is intended by way of illustration and example only, the scope of the invention being limited by the terms of the following claims.

I claim:

1. In a retractable roller system for handling cargo, said system including a main channel member with a bottom wall, first and second opposing side walls, a ledge running along the inner surface of each of said walls, the ledge of said wall being at a higher elevation than the ledge of said first side wall, an inflatable bladder supported on the bottom wall of said channel member, a roller tray member having side walls with ledges running along the outer surfaces of each of said side walls, the ledges of said side walls being at different elevations, rollers supported between said side walls, means for inflating the bladder to drive the roller tray upwardly, and a cover plate having a plurality of apertures formed therein through which at least a portion of each of said rollers can pass, and means for inflating the bladder so that it drives said roller tray upwardly to cause the rollers to protrude through the cover plate apertures, the improvement comprising:

means for removably attaching the cover plate to the main channel member including a pin member fixedly mounted between the side walls of said channel member near one end thereof, said cover plate having opposing side walls extending from the opposite sides thereof, one of the ends of each of said side walls having a slot formed therein, said pin member being installed in said slots, and means for removably attaching the end portions of said cover plate to said channel member, said roller tray being tiltably removable from said main channel member when the bladder is deflated and said cover plate is removed.

2. The device of claim 1 wherein the means for removably attaching the end portions of said cover plate to said channel member comprises a plurality of screws.

3. The device of claim 1 wherein said cover plate is formed in two pieces and means for attaching said two pieces together.

4. The device of claim 2 wherein the means for attaching said cover plate to said channel member further includes a bracket attached to said channel member, said bracket having a pair of threaded apertures formed therein, the cover plate having a pair of apertures formed therein, a pair of said screws passing through said cover plate apertures and threadably engaging the threaded apertures of said bracket.

5. The device of claim 3 wherein the means for attaching said two pieces together comprises a ledge formed in one of said pieces, said ledge having a threaded aperture formed therein, an aperture formed in an end portion of the other of said pieces, and a screw passing through the aperture formed in the other of said pieces and threadably engaging the threaded aperture of said ledge.

* * * * *